United States Patent [19]

Wells

[11] 3,836,974

[45] Sept. 17, 1974

[54] TRANSMITTER SEQUENCING METHOD AND APPARATUS

[75] Inventor: Joel Douglas Wells, Orlando, Fla.

[73] Assignee: Martin Marietta Corporation, Orlando, Fla.

[22] Filed: Oct. 25, 1971

[21] Appl. No.: 191,727

[52] U.S. Cl. ...................... 343/208, 325/39, 325/53, 325/55, 325/158, 340/311

[51] Int. Cl. ............................................ H04b 1/02

[58] Field of Search .................... 325/39, 51, 53–56, 325/58, 157, 158; 343/176, 177, 207, 208; 340/311, 312

[56] References Cited

UNITED STATES PATENTS

| | | | |
|---|---|---|---|
| 2,559,644 | 7/1951 | Landon | 179/15 BM |
| 3,141,928 | 7/1964 | Davey | 178/50 |
| 3,310,741 | 3/1967 | Uitermark et al. | 325/55 |

*Primary Examiner*—Robert L. Griffin
*Assistant Examiner*—Marc E. Bookbinder
*Attorney, Agent, or Firm*—Doane, Swecker & Mathis Burns

[57] ABSTRACT

A plural transmitter, digital data transmission and remote control system in the environment of a paging system in which mutual interference by the transmitters is eliminated through the sequencing thereof. Embodiments compatible with existing tone systems are disclosed for both plural system-single area operation and for plural system-plural area operation.

12 Claims, 10 Drawing Figures

DIGITAL/TONE SYSTEM COMPATABILITY

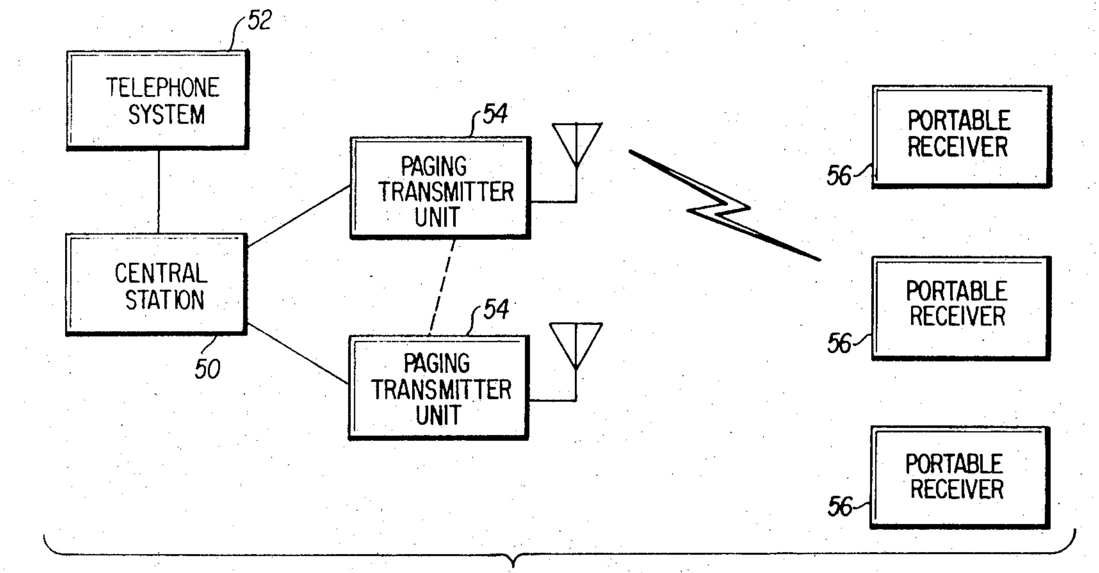
FIG. 1 SYSTEM
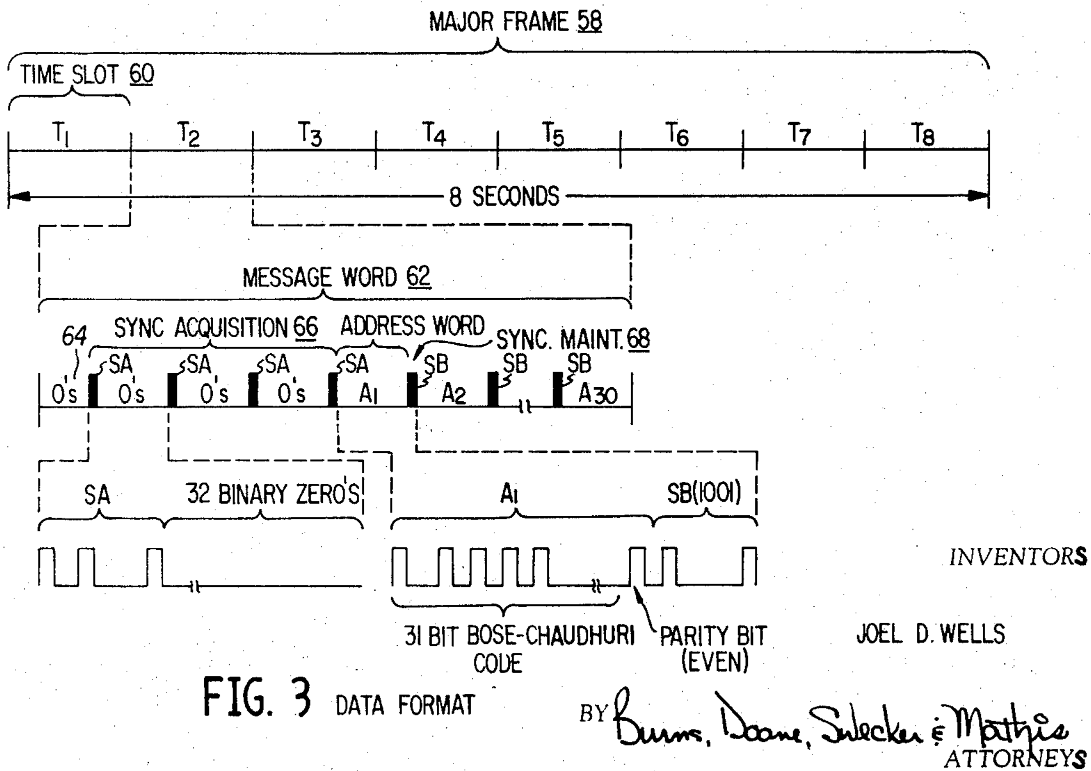
FIG. 3 DATA FORMAT
INVENTORS
JOEL D. WELLS
BY Burns, Doane, Swecker & Mathis
ATTORNEYS

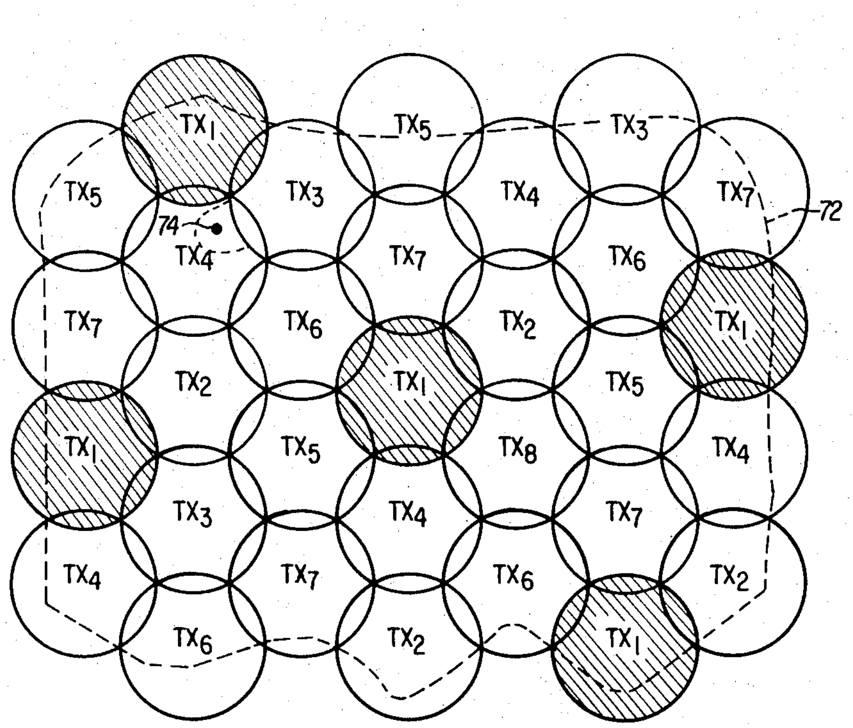
FIG. 4 TRANSMITTER SEQUENCING
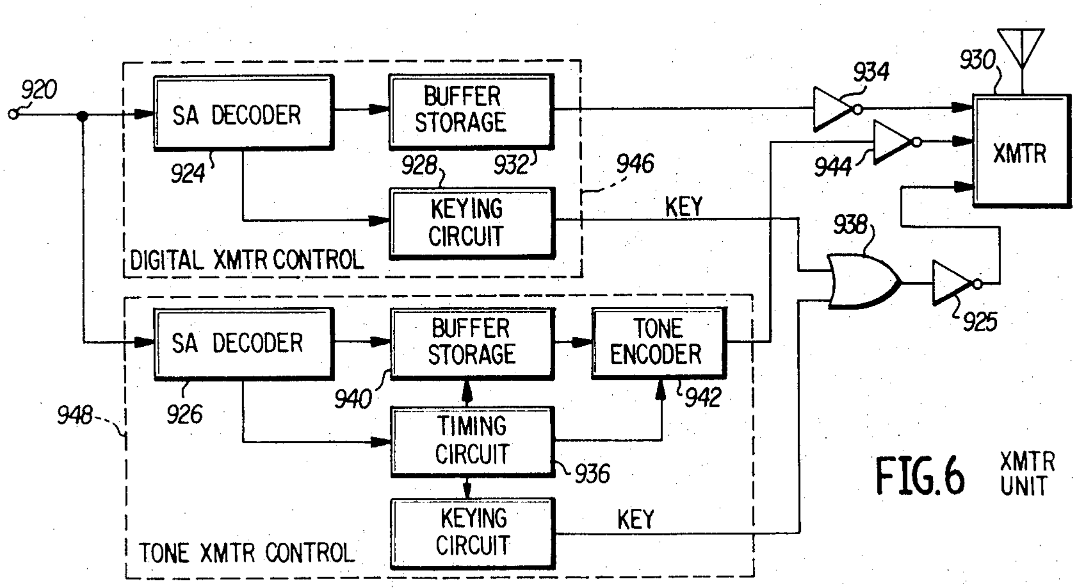
FIG. 6 XMTR UNIT

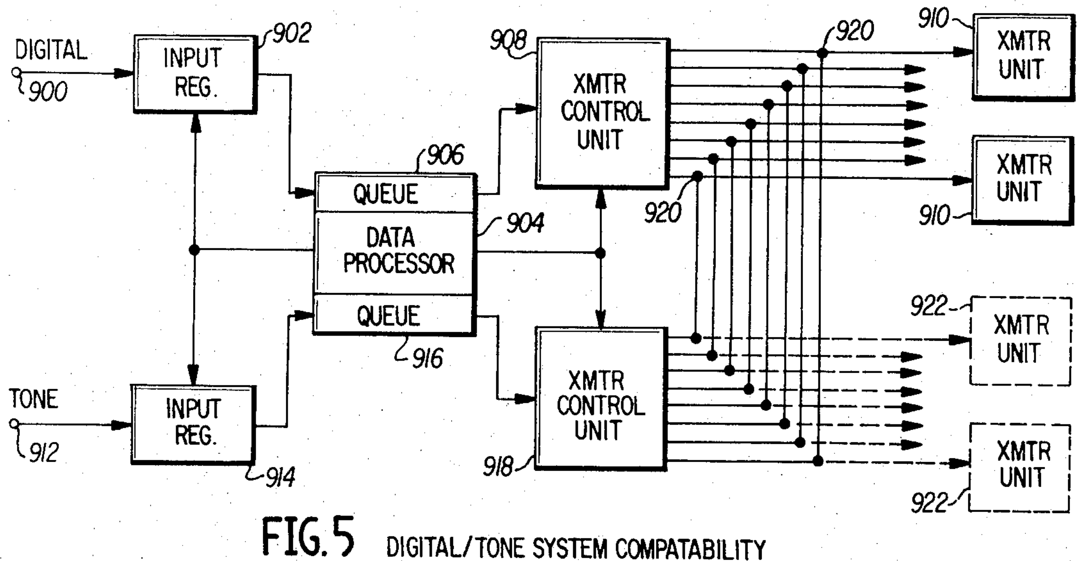
FIG. 5 DIGITAL/TONE SYSTEM COMPATABILITY
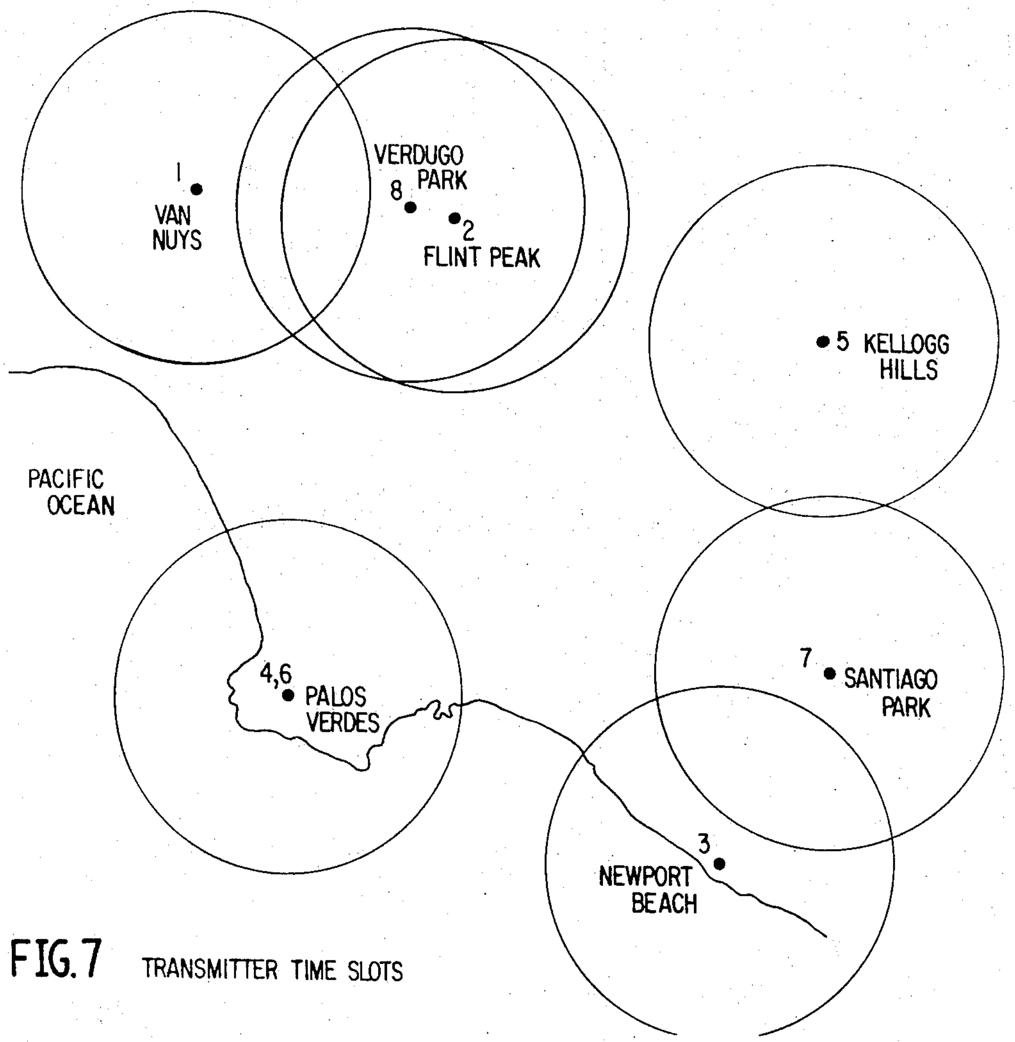
FIG. 7 TRANSMITTER TIME SLOTS

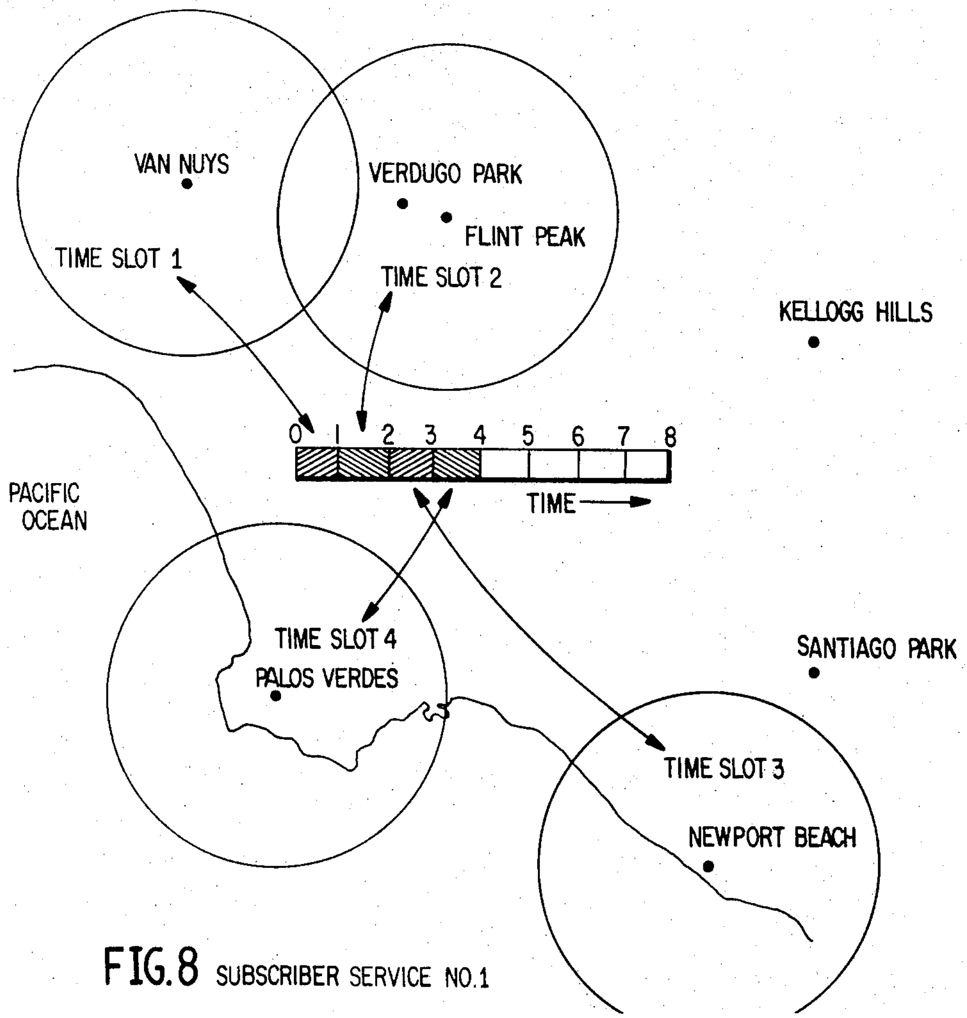
FIG.8 SUBSCRIBER SERVICE NO.1

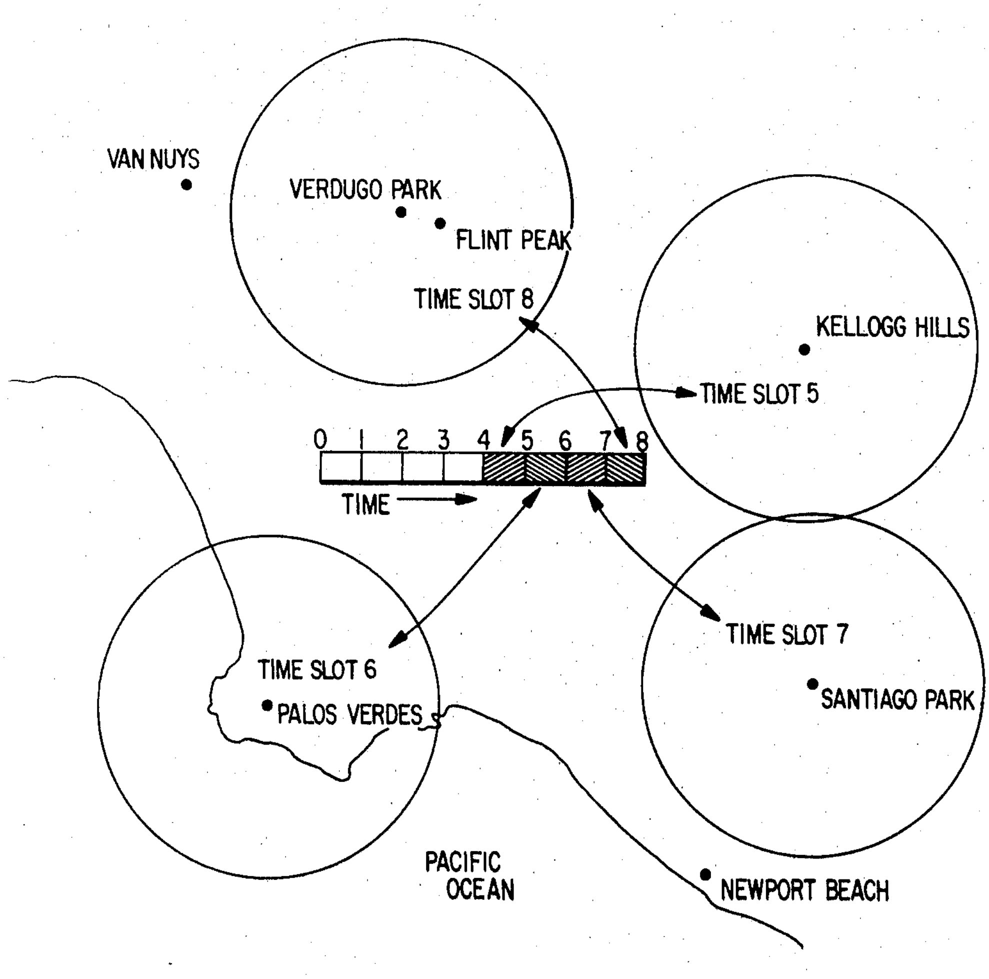
FIG. 9 SUBSCRIBER SERVICES NO. 2 AND NO. 3

TRANSMITTER SEQUENCING METHOD AND APPARATUS

BACKGROUND OF THE INVENTION

The present invention relates to a method and apparatus for data transmission and control. While the applications for the method and apparatus of the present invention are legion both for data transmission and for control, particular utility has been found in the environment of a subscriber paging service and the invention will hereinafter be described in that environment for illustrative purposes.

For example, known paging systems generally involve the selective transmission of subscriber identifying signals via electromagnetic wave energy at line-of-sight frequencies from a plurality of transmitters spaced throughout the paging area. Each of the subscribers is conveniently provided with a portable receiver which provides an audible indication upon the reception and decoding of the assigned subscriber identifying signal.

An interference problem is inherent in such known systems because the line-of-sight propagation characteristic of the electromagnetic radiation necessitates the employment of a plurality of transmitters spaced throughout the paging area to insure the complete coverage thereof, and because all of the portable receivers must be tuned to the same carrier frequency to insure reception throughout the paging area. These known paging systems have thus been faced with the undesirable alternatives of leaving areas between adjacent transmitters wherein a subscriber cannot be paged (blind spots) and of interference due to the overlapping of the propagation patterns of adjacent transmitters.

Since the existence of blind spots is unacceptable to the subscribers in a paging system, the known systems have attempted to synchronize the broadcasting of the paging signal from all of the transmitters. Theoretically at least, the signals from adjacent transmitters received by one of the portable receivers would thus be reinforcing rather than cancelling or interfering, at least when the portable receiver is equidistant from both transmitters, Synchronization, however, has remained a problem.

Attempts to synchronize the transmitters for simultaneous broadcasting have generally involved the use of various delay equalization circuits so that the signals transmitted from a central station over varying distances to the individual transmitters throughout the paging area are received by all of the transmitters at the same instant in time. In addition to the enormous technical difficulties in achieving such delay equalization, such phase sensitive systems have not proved entirely satisfactory in the urban environment in which paging systems are desirable due to the shielding and reflection of the transmitted signals by buildings and other structures.

It is accordingly an object of the present invention to obviate the deficiencies of known data transmission systems and to provide a novel method and apparatus for data transmission and control.

It is another object of the present invention to eliminate the delay eqaulization problems of the known multiple transmitter systems through the selective sequencing of the transmitters within a given transmission area.

It is still another object of the present invention to provide a novel method and apparatus for the elimination of radio frequency phase interference in plural transmitter systems.

Yet still another object of the present invention is to provide a novel method and apparatus for the transmission of digital data.

It is still another object of the present invention to provide a novel method and apparatus for selectively transmitting data.

The above objects are primarily accomplished in the present invention through transmitter sequencing and receiver synchronization. Since the receivers are not operative in the absence of data transmission, the probability of decoding noise is largely eliminated. Moreover, the selection by the receiver of the transmitter as a function of the characteristics of the received signal materially reduces the probability of decoding noisy data from either a weak transmitter or a nearby transmitter which is providing noisy or otherwise undesirable signals.

Digital techniques for the transmission of data signals are particularly advantageous in that an extremely large amount of data may be transmitted from one location to another in short time intervals and with a minimum of complex equipment such as highly accurate frequency generators and mixers as well as highly accurate frequency decoders. For example, a digital word comprising ten binary bits can provide over 1,000 different messages.

Of course, where digital techniques are used, the loss of binary bits in a particular signal may result in an erroneous evaluation of the signal. For example, in prior art digital data transmission systems where a plural bit address or data signal is transmitted and decoded by bit counting or bit comparison techniques as with an AND gate, the loss of a single pulse due to interference or other transmission problems results in erroneous data at the receiving end of the system.

Since many data transmission and control systems have to coexist in the increasingly crowded spectrum of urban areas, a further object of the present invention is to provide a novel method and apparatus for the time sharing of all or a portion of a group of transmitters operating at or near the same frequency by a plurality of different systems within the same transmission area.

It is yet a further object of the present invention to provide a novel method and apparatus for combining digital and FSK data transmission systems within the same transmission area.

Since the method and apparatus of the present invention has particular utility and will be hereinafter described in a subscriber paging system embodiment, it is an object of the present system to obviate the deficiencies of know paging systems and to provide a novel paging method and apparatus.

It is another object of the present invention to eliminate the delay equalization problems of known paging systems through the selective sequencing of transmitters within a given paging area.

It is still another object of the present invention to provide a novel digital paging method and paging system.

It is yet another object of the present invention to provide a novel method and paging system employing both digital and FSK paging data transmission within the same paging area.

Still a further object of the present invention is to provide a novel method and apparatus for the successive broadcast of a plurality of subscriber addresses from each of a plurality of transmitters within a given paging area.

Yet a further object of the present invention is to provide a novel method and apparatus for selectively energizing one or more groups of subscriber service area transmitters within a given paging area.

Yet still another object of the present invention is to provide a novel method and apparatus for the time sharing of all or a portion of a single group of paging transmitters operating at or near the same frequency by a plurality of different paging systems within the same paging area.

These and many other objects and advantages of the present invention will be readily apparent to one skilled in the art to which the invention pertains from the claims and from a perusal of the following detailed description of an exemplary embodiment when read in conjunction with the appended drawings.

THE DRAWINGS

FIG. 1 is a general functional block diagram of a basic embodiment of the system of the present invention in use as a paging system;

FIGS. 2A and 2B together constitute a flow diagram illustrating the operation of the system of FIG. 1;

FIG. 3 is a timing diagram illustrating the data format;

FIG. 4 is a diagram illustrating the transmitter spacing and sequencing within a paging area;

FIG. 5 is a functional block diagram illustrating the compatibility of the paging system of FIG. 1 with a tone system;

FIG. 6 is a functional block diagram of a preferred embodiment of one of the transmitter units of the system of FIG. 5.

FIG. 7 is a geographical representation of the Los Angeles, Calif. area with transmitter propagation patterns superimposed thereon;

FIG. 8 is a geographical representation of the area of FIG. 7 illustrating the relationship between time slots and transmitters in a single paging subscriber service system; and, FIG. 9 is a geographical representation of the area of FIG. 7 illustrating the relationship between time slots and transmitters in two additional systems.

DETAILED DESCRIPTION

Figure 2A:
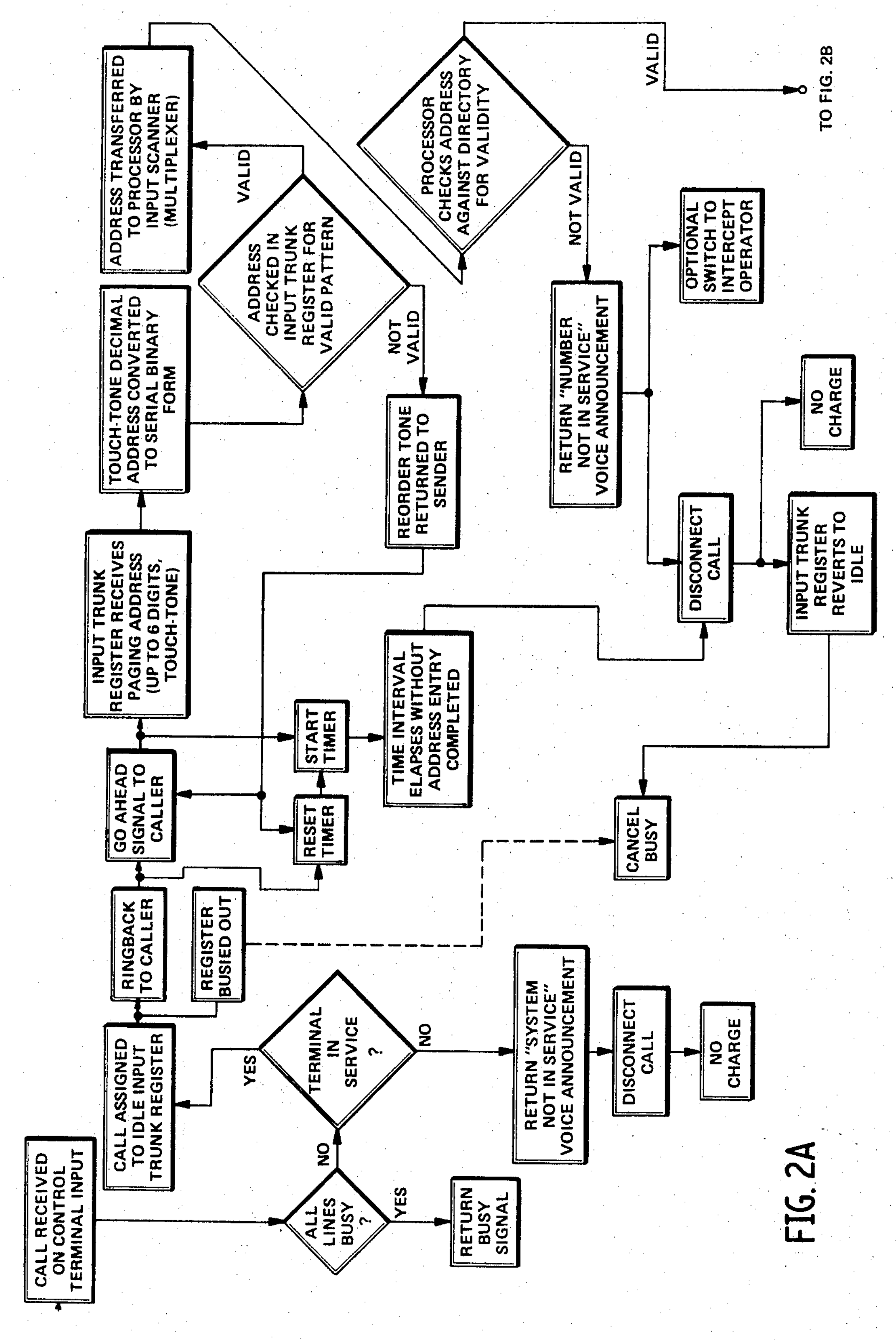

A preferred embodiment and several modifications of the novel system and method of transmitter sequencing in the environment of a paging system are set out infra in accordance with the following Table of Contents:

TABLE OF CONTENTS

I. Basic System Description (FIGS. 1 and 2)
II. Data Format (FIG. 2)
III. Transmitter Sequencing (FIG. 4)
IV. Digital/Tone System Compatibility (FIGS. 5 and 6)
V. Paging Service/Plural Single Paging Area Flexibility (FIGS. 7–9)

I. BASIC SYSTEM DESCRIPTION

With reference to FIG. 1 where a basic paging system embodiment of the present invention is illustrated, the central station 50 may, where the capacity of the system so dictates, include a suitable general purpose digital computer (not shown). The central station 50 may be accessed through any suitable switching system such as the illustrated commercially installed telephone system 52 to receive subscriber designating signals via the commercially installed telephone lines and exchanges of the system 52. In response to the received subscriber designating signals, the central station 50 may generate paging signals for transmission to one or more of a plurality of transmitter units 54 spaced throughout the paging area.

The paging signals transmitted from at least one of the transmitter units 54 are received by portable receivers 56 carried by the individual system subscribers. The receipt of the address signal assigned to a particular subscriber by his portable receiver 56 will provide the subscriber with an indication that a call has been received. The subscriber may thereafter determine the reason for the page by seeking a telephone and dialing a designated number to receive a message or by directly dialing the person who initiated the page if that information is known to the subscriber.

Figure 2B:
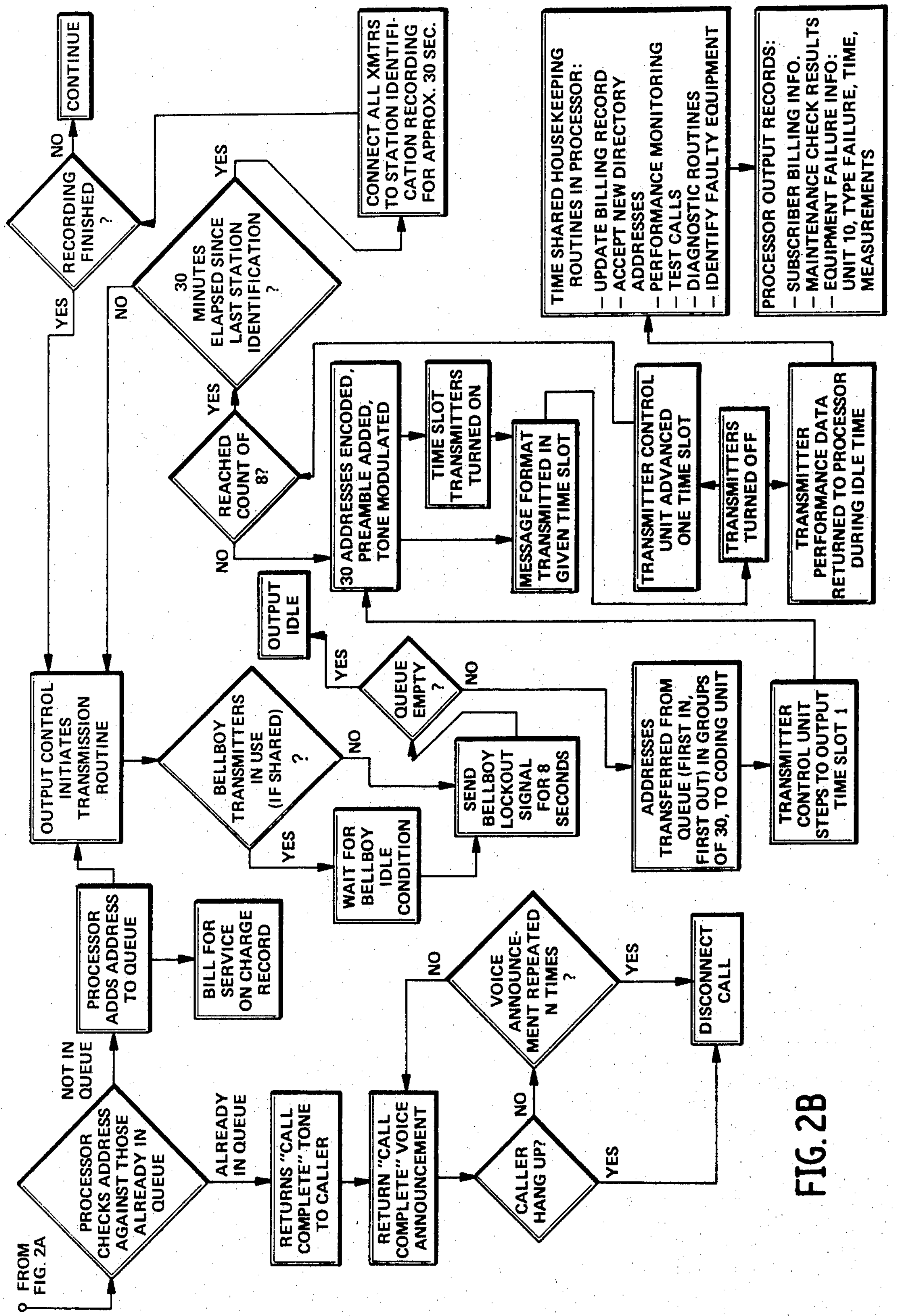

As is illustrated schematically in more detail in the flow diagram of FIG. 2, the party desiring to initiate a page to one of the subscribers may dial a telephone number assigned by the telephone system subscriber service to the central station. This paging system access number may, for example, include one or more conventional telephone numbers each of two or more digits. Where, for example, a seven digit number is used as the paging system access number, all seven digits may be dialed or transmitted as tones from a Touch Tone telephone. In response thereto, the telephone switching equipment will connect the dialing party's telephone to a central station trunk line and provide a "ringing" signal to indicate to the central station that it is being called.

With continued reference to the flow chart of FIG. 2, a "busy" or "hold" signal may be returned to the dialing party if all incoming lines are busy at the central station. If an incoming line is available and if the terminal is in service, the incoming call is assigned to an idle input trunk register and an audible indication, e.g. a "dial" tone and/or an audible voice announcement, may be returned to the dialing party. If, for some reason, the terminal is not in service, a "system not in service" voice announcement may be returned to the dialing party and the call may thereafter be disconnected with no charge to the dialing party.

As will be subsequently explained, the identification of the incoming line may have significance in plural system operation.

After the incoming call has been assigned to an idle input trunk register, the register is busied out by, for example, providing an "off-hook" indication through the closing of a relay. A "go-ahead" signal may then be returned to the paging party and a timer started. The dialing party may then dial the subscriber address number assigned to the particular subscriber to be paged. This type of operation is hereinafter referred to as "end-to-end" dialing, i.e. the digits introduced by the dialing party at one end are transmitted directly to the central station at the other end.

Where, however, end-to-end dialing is not utilized, i.e., a portion of the seven digit telephone number is sufficient to establish the telephonic connection, the subsequently dialed portion of the seven digit telephone number may be stored in the telephone system for retransmission to the central station. These retransmitted two to four digits may be decoded by the central station to provide the subscriber address.

With continued reference to FIG. 2, the subscriber identifying signal, e.g., four or five digits, may be received by the input trunk register as tones or as dial pulses if the switching equipment so provides. If received as two frequency tones, they may then be converted at the central station 50 to serial binary form and checked for frequency validity. If the frequencies of the tones are not valid, e.g., an improper combination, a "reorder" tone or announcement may be returned to the dialer and the timer reset. If the frequencies of the tones are valid, it may be transferred serially in binary form to the computer or other data processor at the central station and there checked against a directory of subscriber addresses for validity.

If the subscriber address is not in the directory stored in the computer or data processor, a voice announcement to that effect may be returned to the caller, the call may be disconnected without charge to the caller, and the input trunk register may be reset to its idle position. If the binary subscriber address represents a valid subscriber address, the serial binary signal may be compared with those subscriber addresses then awaiting transmission to the paging transmitter units 54 as paging signals. If not already in storage, the binary signal may be stored in a first-in, first-out waiting queue for subsequent transmission to the transmitter units 54. Alternatively, the subscriber address may be coded or include a priority indicating digit or portion permitting the priority ordering of the subscriber address in the waiting queue.

Since the answering of the call and receiving and storing of the subscriber addresses may be fully asyncronous to other functions performed by the central station 50, a large number of trunks, e.g., up to 120, may be serviced simultaneously in a suitable conventional manner such as by a time sharing digital computer technique.

The serial binary subscriber addresses stored in the waiting queue may then be sequentially scanned and encoded for transmission as a paging signal to the transmitter units 54 illustrated in FIG. 1. The computer at the central station 50 may sequentially read a predetermined number of subscriber addresses in the waiting queue, e.g., 30 addresses, and encode and combine the selected addresses with synchronizing signals to form a message word having a predetermined number of binary bits. A message word including both the address portions and the synchronizing portions may then be transmitted by the transmitter control units at the central station 50 to the remote transmitter units 54 of FIG. 1 at a predetermined bit rate during a plurality of separate time intervals or time slots, e.g., eight time slots, which together make up a major data frame as will hereinafter be explained.

With reference again to FIG. 1, the message word received by one of the transmitter units 54 during the assigned time slot is evaluated and, if the synchronizing portion of the message word is recognized as valid, the transmitter unit 54 receiving the message word may transmit the entire message word including the synchronizing portion. This evaluation of the message word at each of the transmitter units 54 prevents false keying of the transmitters in the transmitter units 54 by spurious signals while obviating the need for d.c. transmitter control signals or transmitter address signals supplied by either an independent channel or via a time slot designated for transmitter control or address signals. Thus, there is no necessity in the present invention for limiting a time slot to use solely for transmitter control purposes.

At the end of one major frame, i.e., after all of the transmitters have transmitted the message word during the assigned time slots, a new message word assembled from the next 30 subscriber addresses in the waiting queue may be sequentially transmitted to the transmitter units 54.

Since the transmission of data to the transmitter units 54 is asynchronous to the placing of paging requests into the waiting queue for subsequent transmission, there may be times during which the predetermined number of subscriber addresses which make up one message word may not be available in the waiting queue. When this happens, the unused portion of the message word may be filled out with dummy subscriber addresses or "idle words" designated for that purpose. This ensures that the transmission of data is synchronous, i.e., the same number of binary bits is transmitted during each time slot, further ensuring that the receivers 56 do not experience an undesired loss of synchronization as will hereinafter be described.

The dummy subscriber addresses may also be utilized for system testing and for the evaluation of the transmission of the paging signals by the transmitter units 54 where a separate monitor receiver is provided for that purpose.

With reference again to FIG. 2, the computer at the central station 50 of FIG. 1 may additionally perform various automatic or operator initiated compiling and maintenance routines while the system is in operation. For example, the computer at the central station 50 may record all of the calls placed through the paging system for billing purposes and may perform a number of other tasks necessary for the updating of the system, e.g. accepting new directory addresses. The computer may also initiate test calls and other diagnostic and maintenance routines, and may indicate, for example, the occurrence of equipment failure.

In addition, the computer at the central station may be made compatible with other types of paging systems presently in use, e.g., a tone system, through the use of a time sharing technique. For example, at the end of each major data frame (every 8 seconds in the embodiment hereinafter described), the computer may interrogate the tone system to determine whether or not it has requested the use of the system transmitters. If the tone system has requested transmitters, the computer may send an acknowledgment command to the tone system and release the appropriate transmitters. When the request has been terminated, the computer may then control the transmitters in the manner previously described to transmit the encoded message words stored in the waiting queue.

As an alternative to the accessing of the paging system by a seven digit telephone subscriber number as described supra, the first three digits of the telephone number (the NNX Code) may effect the connection between the page initiating party's telephone and central station. In this event, the last four digits of the dialed seven digit number may identify the subscriber to be paged. However, the use of NNX Codes imposes numerical limitations on the system in that only 10,000 subscribers can be assigned four digit addresses beginning with a particular NNX Code. A new NNX Code is thus required for every 10,000 subscribers necessitating the use of five or six different NNX Codes for a system utilized by 50,000 to 60,000 subscribers. Since the number of possible three digit NNX Codes is also limited, a large number of NNX Codes are often difficult to obtain in a heavily populated area. It is thus generally more desirable to use all seven digits of the telephone number to gain access to the paging system and, after gaining access, to dial a number of subsequent digits designating the subscriber. An additional advantage is that a five or six digit subscriber identification may be utilized in lieu of the four digits otherwise generally available. A substantial increase in capacity may thus be realized.

The embodiment of the central station described supra utilizes the two frequency tones of the Touch Tone system for subscriber identification, i.e., the subscriber designating signals are combinations of high and low frequency tones. To use such an embodiment with the conventional dial telephone, it may be necessary for the dialing party to utilize a suitable conventional tone generator to provide the tones for introduction into the established telephone telephonic connections.

Alternatively and as earlier explained, the central station may be configured to receive the subscriber designation signal in digital form in which event the frequency combination validity evaluation earlier described may be eliminated.

Irrespective of the form of the subscriber designation signals and the use or non-use of an NNX Code, the timer initiated upon the generation of "go-ahead" signal will disconnect the call and place the input trunk register in its idle condition if the subscriber identification signals are not received within a predetermined time, e.g. 20 seconds.

The transmission link between the central station 50 and the transmitter units 54 of FIG. 1 may take any convenient form, such as commercially installed or private telephone lines or radiant energy (e.g., lasers, microwave radio, or the like). For example, a separate telephone line may be utilized to connect the central station 50 with each of the transmitter units 54 and each of the transmitters of the transmitter units 54 may transmit the message word during one or more of the time slots through the selective application of the message word to the different telephone lines during a specific time slot.

If voice quality telephone lines are utilized to connect the central station 50 with each of the transmitter units 54, the paging signal, i.e. the message word, may be converted to FSK form for transmission to the remote transmitters. The message word may then be sequentially transmitted to the remote transmitters via the voice quality telephone lines in accordance with any predetermined transmission pattern.

II. DATA FORMAT

The data format utilized with the preferred embodiment of the paging system is illustrated in FIG. 2. As was previously described in connection with FIG. 1, the dialing party initiates subscriber designation signals for transmission to the central station 50 through the telephone system 52. These subscriber designation signals are converted to binary form and stored in a waiting queue at the central station 50 for subsequent encoding and combination with synchronizing signals to form a paging signal which may, for example, comprise a 30 subscriber address message word for repetitive transmission in a predetermined number of time slots during one major data frame. Repetition of the same message word is, of course, not required in a single transmitter system but can be effected if desired.

In the example showin FIG. 2, each major frame 58 may comprise eight 1 second time slots 60 designated $T_1$ through $T_8$. The identical message word 62 may be transmitted during each of the eight time slots of a particular major frame from a different transmitter or group of transmitters as will hereinafter be described in greater detail. Thus, the number of transmitter units 54 of FIG. 1 may be at least equal to the number of time slots utilized in a major frame and a particular transmitter of one of the transmitter units 54 may transmit a message word 62 during one or several of the time slots 60 in a major frame 58. The number of time slots 60 may, of course, exceed the number of transmitters in the system where expansion of the paging area is contemplated.

With continued reference to FIG. 2, each message word 62 is a serial pulse train preferably commencing with a group of 12 binary bits, e.g. 12 binary ZERO bits as indicated at 64, followed by a synchronization (sync) acquisition signal 66, and in turn, followed by 30 different addresses or address words A1–A30 which may be separated from each other by identical sync maintenance signals 68 of 4 binary bits each. The sync acquisition signal 66 preferably includes four identical 4 bit patterns each separated by a 32 binary bit signal, e.g., 32 binary ZEROS in the signal illustrated in FIG. 2. The four identical 4 bit sync patterns (designated SA) are coded in accordance with a predetermined binary code, e.g. 1101 as illustrated. Thus, the sync acquisition signal may be indicated as SA, 0's, SA, 0's, SA, 0's, SA where SA designates the selected 4 bit code and 0's designates the 32 binary ZERO's.

Each address word A1–A30 preferably includes a 31 bit Bose-Chaudhuri coded address designation and one parity bit. Adjacent of the 30 address words A1–A30 are separated by the sync maintenance signal 68 (designated SB) which is preferably a four bit serially coded signal which differs from the sync acquisition code SA. Thus, each message word 62 transmitted during one of the time slots $T_1$–$T_8$ comprises 1,200 binary bits.

The initial 1 binary ZERO bits indicated at 64 in FIG. 2 are not required but may be utilized to assist in bit synchronization of the receivers as will hereinafter be described. In addition, these 12 binary ZERO bits provide some time spacing between the turn on of a transmitter and the transmission of the sync acquisition signal 66 which time spacing may be desirable. The initial 12 binary bits need not, of course, be all binary ZERO's but may be any predetermined code. Simplification of the logic is, however, possible by the use of all ZERO's in the described embodiment and the use thereof may be desirable where, for example, the communications link between the central station 50 and transmitter units 54 of FIG. 1 is omnidirectional transmission of electromagnetic energy at radio frequencies.

When transmitted by the transmitter units 54 of FIG. 1, the synchronization acquisition signals illustrated in FIG. 2 may be utilized by the individual paging receivers 56 to determine the bit error rate of the paging signal prior to decoding the subsequent address words as will subsequently be described in greater detail. The four bit sync maintenance signal SB may be unique to the paging system operating in a particular paging area and may be utilized both to assist in determining the bit error rate and to ensure proper framing of each of the address signals. Moreover, if signals are received by a portable receiver assigned to one paging area from a paging system in an adjacent paging area, the sync maintenance signal SB assigned to the system of the adjacent area will be rejected by the receiver. The likelihood of false synchronization and possible erroneous paging of receivers by signals from the wrong system is thus significantly reduced.

As previously discussed, each of the address words A1–A30 comprises 32 bit positions. The first 31 bit positions may identify the subscriber being paged and the last bit may be inserted as a parity bit. All 32 bits may, however, be used as the subscriber address. The preferred code is a highly redundant Bose-Chaudhuri 31–16–3 code, i.e., 31 total bits are utilized to code a 16 bit message with a 7 bit (2 time 3 + 1) difference between each message. The use of this code with an even parity bit increases the bit difference between codes to a minimum of 8 bits between adjacent unique addresses while allowing the system to service over 65,500 subscribers.

In addition to the extremely high subscriber address capacity provided by the Bose-Chaudhuri 31–16–3 code, the use of this code makes the probability of accepting the correct address very high, while at the same time severely limiting the probability of accepting an address intended for another subscriber, even in very high error environments. For example, if two bit errors are tolerated in decoding an address for a particular subscriber, the probability of a receiver accepting that address is over 99.99 percent. Moreover, since only two bit errors are tolerated in this example in decoding an address, there are still at least six bit differences between the subscriber's address and any other transmitted address.

If the extremely high subscriber capacity achieved with the abovedescribed code is not required, a Bose-Chaudhuri 31–11–5 code may be utilized. The use of this code limits the number of allowable users to 2,047 but increases the number of differences between any two coded address signals to at least 12 bits, significantly reducing still further the probability of false calls. On the other hand, if still higher capacity is required, a Bose-Chaudhuri 31–21–2 code may be utilized. This code provides subscriber capacity of over 2 million with the difference between any two addresses being reduced to a minimum of 6 bits. This lower minimum bit difference of 6 tends to slightly increase the probability of a false call, but the increase is very slight when compared to the vast increase in system capacity.

Irrespective of which of the above codes is utilized, the system data format as illustrated in FIG. 2 may remain the same. Moreover, the central station does not require 31 bit capacity for storing incoming addresses and directory addresses since the highly redundant Bose-Chaudhuri encoded addresses may be readily generated from address signals having fewer than 31 bits, e.g., from a 16 bit address signal when utilizing the preferred Bose-Chaudhuri 31–16–3 code.

III. TRANSMITTER SEQUENCING

Referring now to FIG. 4, the locations of the transmitter units 54 of FIG. 1 are illustrated as a plurality of circles which approximate the propagation pattern of the transmitter associated with the respective transmitter units 54. Each transmitter in FIG. 4 is designated TX1–TX8 corresponding to the time slot T1–T8 of FIG. 3 in which that transmitter is operative. All of the transmitters designated TX1 in FIG. 4 may, for example, transmit the message word 62 of FIG. 3 during the time interval T1.

With continued reference to FIG. 4, the transmitters TX1–TX8 are desirably arranged so that the combined propagation pattern of all of the transmitters provides full coverage of a paging area 72 outlined in phantom. In addition, the propagation patterns of adjacent transmitters, e.g., TX1 and TX3, TX1 and TX4, and TX1 and TX5, may be made to overlap somewhat in the utilization of the present invention without the interference problems associated with simultaneous transmission.

With the utilization of eight time intervals T1–T8 during each major frame 58 as shown in FIG. 3, eight transmitters TX1–TX8 may be provided throughout the paging area 72. If, however, the paging area 72 is extremely large, a plurality of transmitters sufficiently separated to prevent interference therebetween, i.e., to prevent simultaneous reception by a receiver from both transmitters, may be utilized to transmit the message word during a particular time slot. Thus, for example, during the time slot T1, the five transmitters labelled TX1 in FIG. 4 may transmit the identical message word 62. During the next time slot T2, the five transmitters labelled TX2 may transmit the same message word. In this manner, a message word may be transmitted throughout the paging area 72 during one major frame comprising time slots T1–T8 irrespective of the size of the area without the RF phase interference problems of known simultaneous transmission systems.

A message word 62 may be successively transmitted to each transmitter or group of transmitters, e.g., TX1, TX2, TX3, . . . TX8, during one major frame. When, for example, the message word is transmitted to the transmitters TX1, the transmitters TX1 decode the sync acquisition signal SA. If the sync acquisition signal is decoded properly, the transmitter is keyed or turned on. A buffer circuit stores the message word so that none of the data is lost during the decoding operation, and thus, the entire message word beginning at the first bit of the 12 bit 0's pattern 64 or at any other desired point in the message word, e.g., at the first bit of the sync acquisition signal, may be forwarded to the transmitter modulator at the time the transmitter is turned on. The transmitter may then transmit during the assigned time slot and turn off after counting the 1,200 pulses which occur in the 1 second time slot in the embodiment described.

Since each transmitter is assigned to transmit during one minor frame or time slot, and since during a given major frame each transmitter transmits the same message word as is transmitted by the other seven transmitters, a receiver in the paging area 72 would have eight chances to read the message word if the signal transmitted by all of the transmitters could be received by the receiver. In a large metropolitan paging area with many obstructions such as tall buildings, a particular receiver will not generally be able to receive the message word transmitted from all eight of the transmitters. However, the receiver should receive at least one transmitted message word and may, in fact, normally receive the same message word transmitted from two or more different transmitters during different time slots in a major frame. In actual operation, as will hereinafter be explained in greater detail, the receiver may select one time slot for message word evaluation on the basis of the reception characteristics of the received signal. The receiver may thus be prevented from evaluating the addresses in the message word in more than the one selected time slot in a major frame thereby conserving power.

For example as illustrated in FIG. 4, a receiver 74 may be located in the area covered by the primary propagation pattern of one of the transmitters designated TX4. During the time slots T1, T2 and T3, the receiver 74 may receive a faint signal from each of the transmitters TX1–TX3, which may or may not be sufficiently error free to permit proper decoding of the message word transmitted during these time slots.

Should the receiver 74 receive signals from more than one transmitter in the same time slot in ratios which produce an unacceptable error condition, the receiver 74 will abandon that time slot and select another time slot where the error rate is acceptable even though the signal strength is reduced. In a tall building, for example, a given receiver might receive the message word from all or at least a majority of the transmitters within the system and would have great flexibility in selecting a time slot with adequate bit error conditions.

The receiver 74 decodes the sync acquisition signal including the four bit SA patterns and the 32 O's patterns transmitted during the initial portion of each time slot and, if the sync acquisition signal is received substantially error free, the receiver decodes the subsequently received address words. At the end of a time slot, the receiver 74 is deenergized for slightly less than 7 seconds if substantially error free sync acquisition and sync maintenance signals are detected properly throughout the time slot.

Assuming, for example, that the receiver 74 does not acquire sync during the time slots T1 and T2 due to obstructions between the transmitters TX1 and TX2 and the receiver 74, the receiver 74 will remain energized until sync is acquired at which time the addresses immediately following the sync acquisition signal in that message word will be evaluated. The receiver 74 may, for example, receive a substantially error free message word from the transmitter TX3 during the time slot T3 if, as illustrated in phantom, the propagation pattern of the transmitter TX3 exends into the area in which the receiver 74 is located. The receiver 74 would thus successfully synchronize during the time slot T3 and, after having decoded the 30 address words transmitted during that time slot, would shut down for approximately 7 seconds to be automatically reenergized in time to once again receive a message word during the time slot T3 in the next major frame.

The successful evaluation of an address by a receiver may result in the generation of an audible tone or ennunciated message so that the subscriber is informed of the page. The receiver may be provided with two or more address evaluators and respond with different audible tones to indicate to the subscriber the origin of the page, e.g., home or office, or the degree of urgency of the page. The two different audible signals may be a steady and an interrupted tone and any suitable visual indicators may be utilized in addition to, or in lieu of, the audible signals.

A more detailed discussion of the system of FIG. 1 and its operation may be obtained from the Sabin, Jr. et al. patent application Ser. No. 191,855 entitled "Data Transmission Method and Apparatus" filed concurrently herewith and assigned to the assignee of the present invention. The disclosure of said Sabin, Jr. et al. patent application Ser. No. 191,855 is hereby incorporated herein by reference.

IV. DIGITAL/TONE SYSTEM COMPATABILITY

The compatability of the digital paging system described above with a conventional tone system is illustrated in the block diagrams of FIGS. 5 and 6. With reference now to FIG. 5, the incoming dialing signals intended for the basic digital system earlier described may be received at the central station over one or more input trunk lines directly connected by a collective input terminal 900 to a plurality of input registers 902. The input registers may be selectively scanned under control of a data processor 904 as earlier described to provide the digital message word stored in a message queue 906 associated therewith. These message words from the queue 906 are selectively fed under control of the data processor 904 to a transmitter control unit 908. The output signals from the transmitter control unit 908 may be selectively provided over a plurality of voice quality telephone lines each connected to one or more of the transmitter units 910 spaced throughout the paging area.

Similarly, the subscriber designating signals intended for a conventional tone system may be received via one or more trunk lines and an input terminal 912 and applied therefrom to a second series of input registers 914 at the central station. Paging addresses from this second set of input registers 914 may be applied under the control of the same data processor 904 to a second message queue 916 for formation of the conventional message word. The message word from the second queue 916 may thereafter be applied under the control of the data processor 904 to a second transmitter control unit 918 and the output signals therefrom applied over the same voice quality telephone lines to the same plurality of transmitters 910 spaced throughout the paging area.

The operation of the two systems are readily distinguishable in that the basic digital system earlier described provides via the transmitter control unit 908 the same message word from the queue 906 sequentially on the plurality of output terminals 920 thereof in different time slots. In contrast, the simultaneous application of the message word from the tone system queue 916 to the same output terminals 920 of the transmitter control unit 918 may be in one time slot, not necessarily of the same duration as the time slots used for the digital system. In this manner, the transmitters of the transmitter units 910 may sequentially receive the same digital message word from the digital system to effect the time slot operation earlier described in connection with FIG. 4. At the termination of the transmission of the digital message word illustrated in FIG. 3 by each of the transmitter units 910, the system may revert under the control of the data processor 904 to tone system operation at which time the tone message word may be sent to the same transmitter units 910 for simultaneous broadcast in one time slot to the portable receivers of the tone system within the same paging area. At the end of the simultaneous broadcasting of the tone system message word, the system may again revert under the control of the data processor 904 to digital system operation.

It is to be understood, of course, that the allocation of time between the digital and tone systems may be made by the data processor 904 on a need basis through the scanning by the data processor 904 of the input registers 902 and 914. While various subscriber digital address codes may be utilized to distinguish between these systems, the use of different groups of input registers connected respectively to different groups of telephone trunk lines provides a ready means of differentiating between the systems on the basis of the telephone NNX Codes or subscriber telephone numbers assigned by the telephone company to the central station.

Alternative to the use of the same transmitters by both the digital and tone systems and with continued reference to FIG. 5, the output signals from the transmitter control unit 918 of the tone system may be applied as shown in phantom in FIG. 5 to a different group of transmitter units 922 spaced throughout the same paging area. These transmitter units 922 may be physically located at the same transmitter sites without interference between the systems since the temporal operation of the two systems is mutually exclusive under the control of the data processor 904.

When the same transmitter units are used for both digital and tone systems, the mutually exclusiveness of the systems may be accomplished by the utilization of different sync acquisition codes. For example and with reference to FIG. 6, the message word applied to an input terminal 920 of one of the transmitter units 910 of FIG. 5 may be applied in parallel to two different sync acquisition decoder units 924 and 926. The decoding of the sync acquisition code SA is operable through a keying circuit 928 to provide a KEY signal to the keying input terminal 925 of the transmitter 930 through an OR gate 938. The entire message word received on the input terminal 920 may be passed through the decoder 924 and stored in a buffer storage unit 932. The entire message word may subsequently be applied therefrom to the pulse modulation input terminal 934 of the transmitter 930. The application of the KEY signal is timed to effect the transmission of the entire message word.

Should the sync acquisition code SA of the message word applied to the input terminal 920 fail to properly decode in the decoder 924, the KEY signal will not be generated by the keying circuit 928 and the transmitter 930 will not broadcast the message word notwithstanding the application thereof to the pulse modulation input terminal 934 of the transmitter 930 from the buffer storage unit 932.

If the transmitters 930 are to be utilized in the tone system, the sync acquisition code SA of the message word will not be recognized by any of the decoders 924 at the transmitter units 910. However, the second sync acquisition decoder 926 at all of the transmitter sites will recognize the sync acquisition code SA as indicating tone system operation and will apply a keying signal to a timing circuit 936 where the delay equalization necessary for simultaneous transmission by the various transmitters 930 can be effected. After an appropriate delay in the timing circuit 936, a KEY signal will be generated for application to the keying input terminal 925 of the transmitter 930 through the OR gate 938.

Also under control of the timing circuit 936, the message word received on the input terminal 920 may be applied through the sync acquisition decoder 926 into a buffer storage unit 940. When read out of the buffer storage unit 940, the message word may be encoded in a conventional tone encoder 942 to provide the tone modulation signal for application to the voice modulation input terminal 944 of the transmitter 930. In tone system operation, the entire message word will thus be simultaneously transmitted from each of the transmitters 930 within the paging area.

The transmitter control units 946 and 948 respectively assocated with the digital and tone systems may of course be seperately connected to a common central station as suggested in FIG. 5 and/or the transmitter units 910 and 922 located at the same or different sites in the paging area.

V. PLURAL PAGING SERVICE/SINGLE PAGING AREA FLEXIBILITY

The flexibility of the present invention when utilized as a paging system is illustrated in FIGS. 7–9. With reference for example to FIG. 7, a geographic representation of the Los Angeles, Calif. area is illustrated with the location of seven different transmitter sites specified thereon. The propagation patterns of the seven transmitters are illustrated as circles in FIG. 7 with the circles centered on the transmitter site. While it is to be recognized that the propagation patterns of each of the transmitters is a function of the terrain, representation as a circle is adequate for illustrative purposes.

The numerals 1–8 associated with the seven transmitter sites in FIG. 7 correspond to the eight time slots of the basic system earlier described. Note that the transmitter site at Palos Verdes is operative in two time slots in the illustrative system described. This fact, as well as the time slot relationship of the seven transmitters, will be apparent from the following chart:

| XMTR Site | System No. 1 | System No. 1 | System No. 1 | System No. 1 | System No. 2 | System No. 3 | System No. 3 | System No. 3 |
|---|---|---|---|---|---|---|---|---|
| Van Nuys | XXX | | | | | | | |
| Flint Peak | | XXX | | | | | | |
| Newport Beach | | | XXX | | | | | |
| Palos Verdes | | | | XXX | | *** | | |
| Kellogg Hills | | | | | 000 | | | |
| Santiago Park | | | | | | | *** | |
| Verdugo Park | | | | | | | | *** |

With reference now to FIG. 8, a radio paging system embodiment of the present invention is illustrated as a single subscriber service denominated subscriber service No. 1 with transmitters located respectively at Van Nuys, Flint Peak, Newport Beach and Palos Verdes. In such an illustrative system, the message word described in connection with FIG. 3 is transmitted sequentially from each of the four transmitters in four consecutive 1 second time slots 1–4 in a single 8 second major frame. The overlap in the propagation patterns of the Van Nuys and Flint Peak transmitters does not present interference problems due to the sequencing of the transmitters, i.e., the operation thereof is mutually exclusive.

As was explained in connection with FIG. 4, the number of transmitters in the paging area can be expanded as described with two or more transmitters broadcasting during each of the four designated time slots. In such an expanded system, the interference problems associated with the conventional systems is avoided by spacing each of the transmitters broadcasting in a single time slot sufficiently to avoid overlap of the propagation patterns of the transmitters.

As illustrated in FIG. 9, four of the seven transmitters sites identified in FIG. 7 are utilized in two additional subscriber services. The Subscriber Service No. 2 utilizes only the Kellogg Hills transmitter operative in time slot 5. Subscriber Service No. 3 utilizes the transmitters at Palos Verdes, Santiago Park and Verdugo Park respectively in time slots 6–8. As explained in connection with FIG. 8, the overlap in the propagation patterns of the adjacent Kellogg Hills and Santiago Park transmitters presents no interference problem due to the temporal spacing between the broadcasting periods. The system, as illustrated, is thus operative with overlapping propagation patterns of transmitters operating at the same frequency and responsive to two entirely different subscriber services.

It should also be noted above that the Palos Verdes Transmitter is operative for Subscriber Service No. 1 in time slot 4 to broadcast one message word to paging subscribers in that area and is again operative for Subscriber Service No. 3 in time slot 6 broadcast a different message word for reception by an entirely different group of paging receivers within the same area.

False calls within the paging area as a result of the transmission of the paging message word at the same frequency by the same transmitter by different paging services is prevented by the receiver recognition of the different sync acquisition and/or sync maintenance codes SA and SB assigned to the different services as earlier described. Once, for example, a portable receiver in the Palos Verdes area has acquired sync, the receiver will evaluate the addresses within the message word transmitted in the time slot in which sync is acquired. The receiver will thereafter disable itself for approximately 7 seconds reenergizing itself to evaluate the addresses transmitted in the message word in the same time slot in the next major frame. Each of the portable receivers of one subscriber service is thus deenergized during the period in which the Palos Verdes transmitter broadcasts to subscribers in the other subscriber service in the other time slot.

The above figures illustrate the effectiveness and reliability of the method and system of the present invention when embodied as a subscriber paging service. The present invention, however, has numerous other applications in data transmission and control of remote apparatus. The present invention may thus be embodied in other specific forms without departing from the spirit or essential characteristics thereof. The presently disclosed exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of transmitting radio paging signals comprising the steps of:

a. providing a plurality of transmitters spaced throughout a paging area;

b. providing a paging signal including a plurality of subscriber address signals, at least some of the plurality of subscriber address signals designating different subscribers;

c. transmitting the paging signal including the plurality of subscriber address signals from a first one of the plurality of transmitters in a first time slot; and, d. transmitting the same paging signal from a second one of the plurality of transmitters in a second time slot, the first one of the plurality of transmitters being inoperative to transmit during the second time slot and the second one of the plurality of transmitters being inoperative to transmit during the first time slot.

2. The method of claim 1 wherein the same paging signal is transmitted by a plurality of transmitters in at least one of the time slots.

3. The method of claim 1 wherein the same paging signal is transmitted by a plurality of transmitters in each of the time slots.

4. A method for transmitting a data signal comprising the steps of:

a. providing a plurality of electromagnetic wave energy transmitters in a predetermined geographical area, the transmitters being spaced throughout the geographical area for substantial coverage of the geographical area by the combined propagation patterns of the transmitters;

b. compiling a digital data signal comprising a plurality of plural binary bit, digital address signals;

c. sequentially transmitting the same digital data signal from each of the transmitters in accordance with a predetermined sequence the sequence being such that immediately adjacent ones of the transmitters do not simultaneously transmit whereby the data signal can be received essentially throughout the predetermined geographical area at least once during the sequence without mutual interference by the transmitters.

5. A method of transmitting a signal throughout a predetermined geographical area exceeding in area the propagation pattern of a single transmitter comprising the steps of:

a. providing a plurality of transmitters at spaced positions throughout a predetermined geographical area exceeding in area the propagation pattern of any one of the transmitters;

b. providing a first digitally encoded data signal including a plurality of different receiver address codes; and, c. successively transmitting the first digitally encoded data signal including the plurality of different receiver address codes from each of the plurality of transmitters in a different time slot in a major data frame, each of the plurality of transmitters being inoperative to transmit during at least one entire time slot of the major frame, whereby the first digitally encoded data signal can be propagated throughout the geographical area without transmitter interference.

6. The method of claim 5 including the further steps of providing a second digitally encoded data signal, and successively transmitting the second digitally encoded data signal from each of the plurality of transmitters in a different time slot in a second major data frame.

7. Apparatus for transmitting a data signal comprising:

a plurality of transmitters operable at only one carrier frequency and having overlapping propagation patterns;

means for generating a plurality of plural binary bit, digital data signals each including a plurality of different address words; and, means responsive to said generating means for selectively operating said plurality of transmitters to effect the transmission of a first one of said plurality of generated digital data signals from each of said plurality of transmitters such that the transmission of said first one of said digital data signals by transmitters having overlapping propagation patterns is mutually exclusive so that the message word is not simultaneously transmitted from immediately adjacent ones of said plurality of transmitters, said operating means thereafter selectively operating said plurality of transmitters to effect the transmission of a second one of said plurality of generated digital data signals by each of said transmitters.

8. The apparatus of claim 7 wherein said operating means effects the transmission of said second data signal such that transmission of said second data signal by transmitters having overlapping propagation patterns is mutually exclusive.

9. Apparatus for paging a subscriber comprising:

a plurality of transmitters spaced throughout a paging area;

means for generating a paging signal including a plurality of subscriber address signals; and, means responsive to said paging signal generating means and cooperable with said plurality of transmitters for selectively operating said transmitters to effect the transmission of said paging signal from at least one of said plurality of transmitters in a first time slot and to effect the transmission of said paging signal from at least one of said plurality of transmitters in a second time slot;

said at least one of the transmitters transmitting in said first time slot being different from said at least one of the transmitters transmitting in said second time slot and being rendered inoperative by said operating means to transmit said paging signal in said second time slot.

10. The apparatus of claim 9 wherein said paging signal is transmitted by a plurality of transmitters in each of said time slots, all of the transmitters transmitting in said first time slot being different from all of the transmitters transmitting in said second time slot.

11. The apparatus of claim 10 wherein all of said plurality of transmitters transmit at substantially the same carrier frequency.

12. Apparatus for transmitting a digital radio paging signal comprising:

a first fixed frequency transmitter operable to transmit at only one predetermined carrier frequency;

a second fixed frequency transmitter spaced from said first transmitter and operable to transmit at only said predetermined carrier frequency;

means for generating a digital paging signal including a plurality of digital address signals, at least some of said digital address signals identifying different individual subscribers; and, means for sequentially applying said digital paging signal to each of said first and second transmitters to effect the transmission of said digital paging signal at said predetermined carrier frequency, the sequential application of said digital paging signal to said transmitters being mutually exclusive so that only one of said first and second transmitters is transmitting said digital paging signal at any instant.

* * * * *